(12) United States Patent
Ganser

(10) Patent No.: US 11,194,147 B2
(45) Date of Patent: Dec. 7, 2021

(54) MICROSCOPE AND METHOD FOR OPTICALLY EXAMINING AND/OR MANIPULATING A MICROSCOPIC SAMPLE

(71) Applicant: Leica Microsystems CMS GmbH, Wetzlar (DE)

(72) Inventor: Michael Ganser, Giessen (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 213 days.

(21) Appl. No.: 15/328,064

(22) PCT Filed: Jul. 24, 2015

(86) PCT No.: PCT/EP2015/067035
§ 371 (c)(1),
(2) Date: Jan. 23, 2017

(87) PCT Pub. No.: WO2016/012606
PCT Pub. Date: Jan. 28, 2016

(65) Prior Publication Data
US 2017/0219810 A1     Aug. 3, 2017

(30) Foreign Application Priority Data

Jul. 25, 2014    (DE) ..................... 10 2014 110 575.3

(51) Int. Cl.
*G02B 21/00*     (2006.01)
*G02B 21/06*     (2006.01)
(Continued)

(52) U.S. Cl.
CPC ........... *G02B 21/06* (2013.01); *G02B 6/0005* (2013.01); *G02B 21/16* (2013.01); *G02B 26/0816* (2013.01); *G02B 27/14* (2013.01)

(58) Field of Classification Search
CPC .. G02B 6/0005; G02B 7/00; G02B 21/06–16; G02B 21/24; G02B 21/362;
(Continued)

(56) References Cited

U.S. PATENT DOCUMENTS 4,148,552 A * 4/1979 Suzuki ................. G02B 21/088
359/388
4,284,327 A * 8/1981 Kraft .................... G02B 21/088
359/388
(Continued)

FOREIGN PATENT DOCUMENTS

DE          19702753 A1    7/1998
DE          10235388 A1    2/2004
(Continued)

*Primary Examiner* — Thong Q Nguyen
(74) *Attorney, Agent, or Firm* — Leydig, Voit & Mayer, Ltd.

(57) ABSTRACT

A method for optically examining or manipulating a microscopic sample includes positioning the sample in front of a lens which is arranged both in an observation beam path and in an illumination beam path of a microscope which has a main beam splitter which separates the paths. An illumination device is selected depending on the type of sample or examination, or a manipulation of the sample to be carried out. The selected illumination device is coupled in a predefined desired position to a mechanical coupling interface of the microscope. An illumination light from the selected illumination device is directed along the illumination beam path to the main beam splitter and from there to the lens and through the lens onto the sample. No optical component for imaging, focusing and/or defocusing is arranged on a light path of the illumination light between the optical apparatus and the lens.

27 Claims, 9 Drawing Sheets

(51) Int. Cl.
*F21V 8/00* (2006.01)
*G02B 21/16* (2006.01)
*G02B 26/08* (2006.01)
*G02B 27/14* (2006.01)

(58) Field of Classification Search
CPC .. G02B 26/0816; G02B 27/14; G02B 27/141; G02B 27/144; G02B 27/145; G02B 27/283
USPC .......................................... 359/503, 385–390
See application file for complete search history.

(56) References Cited

U.S. PATENT DOCUMENTS

| | | | | |
|---|---|---|---|---|
| 5,073,018 A | * | 12/1991 | Kino | G01B 9/02042 |
| | | | | 359/368 |
| 5,260,569 A | * | 11/1993 | Kimura | G02B 21/0076 |
| | | | | 250/234 |
| 5,777,784 A | * | 7/1998 | Tanaka | G02B 21/082 |
| | | | | 359/381 |
| 2003/0021035 A1 | * | 1/2003 | Kusaka | G02B 21/06 |
| | | | | 359/685 |
| 2004/0178334 A1 | * | 9/2004 | Sasaki | G02B 21/002 |
| | | | | 250/234 |
| 2005/0224692 A1 | * | 10/2005 | Tsuchiya | G02B 21/16 |
| | | | | 250/201.3 |
| 2006/0017920 A1 | * | 1/2006 | Tsuchiya | G01N 21/6458 |
| | | | | 356/317 |
| 2006/0087730 A1 | | 4/2006 | Claus | |
| 2006/0109563 A1 | | 5/2006 | Peter | |
| 2008/0198448 A1 | | 8/2008 | Michael et al. | |
| 2011/0122489 A1 | * | 5/2011 | Matsuo | G02B 21/0048 |
| | | | | 359/385 |
| 2013/0338968 A1 | * | 12/2013 | Hanashi | G01N 21/6408 |
| | | | | 702/189 |
| 2014/0070106 A1 | | 3/2014 | Peter et al. | |

FOREIGN PATENT DOCUMENTS

| | | |
|---|---|---|
| DE | 102005054184 A1 | 5/2007 |
| DE | 102006009053 A1 | 8/2007 |
| DE | 102007007797 A1 | 8/2008 |
| DE | 102010042200 A1 | 4/2012 |
| EP | 1895348 A1 | 3/2008 |
| EP | 2660640 A1 | 11/2013 |
| JP | 2005345717 A | 12/2005 |
| JP | 2006126836 A | 5/2006 |
| JP | 2006154237 A | 6/2006 |
| JP | 2008164719 A | 7/2008 |
| JP | 2009151108 A | 7/2009 |
| JP | 2010164854 A | 7/2010 |
| JP | 2014052534 A * | 3/2014 |
| JP | 2014052534 A * | 3/2014 |

* cited by examiner

MICROSCOPE AND METHOD FOR OPTICALLY EXAMINING AND/OR MANIPULATING A MICROSCOPIC SAMPLE

CROSS-REFERENCE TO PRIOR APPLICATIONS

This application is a U.S. National Stage Application under 35 U.S.C. § 371 of International Application No. PCT/EP2015/067035 filed on Jul. 24, 2015, and claims benefit to German Patent Application No. DE 10 2014 110 575.3 filed on Jul. 25, 2014. The International Application was published in German on Jan. 28, 2016 as WO 2016/012606 A1 under PCT Article 21(2).

FIELD

The invention relates to a method for optically examining and/or manipulating a microscopic sample.

The invention also relates to a microscope which has a lens and a main beam splitter, the lens being arranged both in an observation beam path and in an illumination beam path and the main beam splitter separating the observation beam path from the illumination beam path.

The invention moreover relates to an illumination device as a component for producing a microscope of this type.

BACKGROUND

In incident light microscopy, in particular fluorescence microscopy, the illumination light of an illumination device is guided along an illumination beam path and directed by the lens onto the sample to be examined. The observation light emanating from the sample extends along an observation beam path, which spatially overlaps the illumination beam path in the region of the lens, to the eye of the user or to a detector. The separation of the illumination beam path and the observation beam path takes place by means of a main beam splitter which, in particular in fluorescence applications, is generally designed as a colored beam splitter which reflects the illumination light to the lens and the sample and allows the observation light emanating from the sample to pass.

A plurality of lenses, shutters, optionally diffusing discs, filters, in particular color and/or grey filters, are arranged in the illumination beam path in order to adapt the illumination device to the requirements of the remaining microscope optical system, the sample and the application.

Some microscopes have a plurality of illumination devices and provide the possibility of applying the illumination light of the plurality of illumination devices to the sample simultaneously or sequentially.

A microscope comprising a plurality of optical units, which are arranged so as to be optically connected in series in the observation beam path of the microscope, is known from EP 2 660 640 A1. Each of the plurality of optical units contains one illumination device and one filter block. The filter blocks are used to direct the illumination light of the illumination device in question to the optical axis of the lens. This solution has the drawback that a very long observation beam path is necessary in order for sufficient installation space to be available for the plurality of optical units, which is unfavorable both mechanically and optically. Moreover, the observation light disadvantageously undergoes a particularly large beam offset because it extends through the plurality of filter blocks and therefore through a plurality of beam splitter plates positioned obliquely with respect to the observation beam path.

An illumination apparatus comprising at least four semiconductor radiation sources for emitting optical radiation in different emission wavelength regions in each case is known from DE 10 2005 054 184 A1. At least one color splitter, which is reflective for the optical radiation of the semiconductor radiation source in question, is associated in each case with at least three of the semiconductor radiation sources. The semiconductor radiation sources and the color splitters are arranged in such a way that the optical radiation emitted by each of the semiconductor radiation sources is coupled into a common illumination beam path portion of the illumination apparatus. A collimation device is arranged in each case in different beam path portions from the semiconductor radiation sources to the color splitters, which collimation device collimates the optical radiation emitted by the semiconductor radiation source in question. DE 10 2005 054 184 A1 discloses coupling the illumination apparatus in addition to an illumination device already present in the microscope stand, namely a white-light light-emitting diode, to the microscope, the light of the illumination apparatus coupled into the illumination beam path of the microscope passing through an illumination tube optical system that is a component of the microscope.

SUMMARY

In an embodiment, the present invention provides a method for optically examining or manipulating a microscopic sample. The sample is positioned in a desired sample position in front of a lens which is arranged both in an observation beam path and in an illumination beam path of a microscope which has a main beam splitter which separates the observation beam path from the illumination beam path. At least one illumination device comprising an illumination optical system is selected from a plurality of different illumination devices depending on at least one of a type of the sample, a type of an examination or a type of a manipulation of the sample to be carried out. The selected at least one illumination device is coupled in a predefined desired position to a mechanical coupling interface of the microscope. An illumination light emanating from the selected at least one illumination device is directed by an optical apparatus along the illumination beam path to the main beam splitter and from there to the lens and through the lens onto the sample. No optical component that is at least one of an imaging optical component, a focusing optical component or a defocusing optical component is arranged on a light path of the illumination light between the optical apparatus and the lens.

BRIEF DESCRIPTION OF THE DRAWINGS

The present invention will be described in even greater detail below based on the exemplary, schematic figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
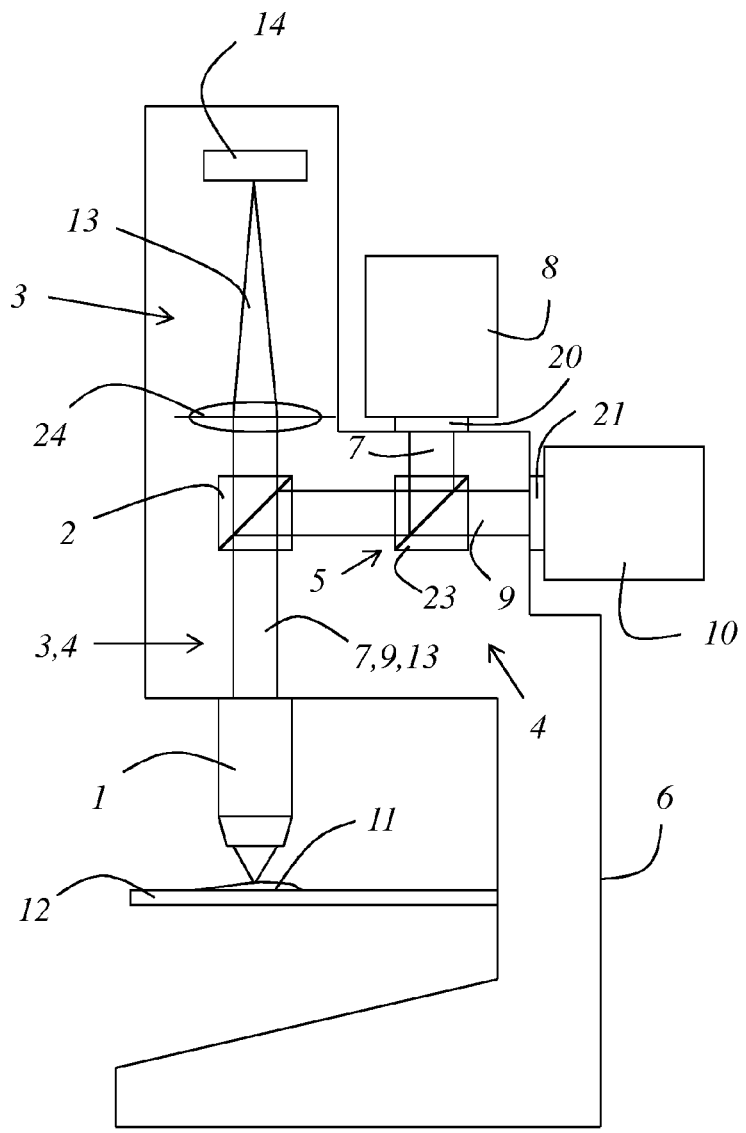
FIG. 1 shows a first embodiment of a microscope according to the invention.

The inventor has recognized that the arrangement known from DE 10 2005 054 184 A1 has the drawback that the individual illumination devices cannot be exchanged individually and specifically to the application as they are either rigidly installed in the microscope stand or in the illumination apparatus. Moreover, a particular drawback is that the illumination light of all the semiconductor radiation sources provided by the illumination apparatus has to satisfy particular conditions with regard to the beam form and size, said conditions being predetermined in particular by the illumination tube optical system. In this respect, the possibility of coupling differently formed illumination light beam bundles for different applications is very limited.

In an embodiment, the present invention provides a method for optically examining and/or manipulating a microscopic sample which can be flexibly used for a large number of the most varied types of examination and/or types of manipulation.

The method according to an embodiment of the invention comprises the following steps:
a. positioning the sample in a desired sample position in front of a lens of a microscope which is arranged both in the observation beam path and in the illumination beam path and which has a main beam splitter which separates an observation beam path from an illumination beam path,
b. selecting at least one illumination device from a large number of different illumination devices depending on the type of sample and/or the type of examination and/or manipulation to be carried out,
c. coupling the selected illumination device in a predefined desired position to a mechanical coupling interface of the microscope,
d. directing the illumination light emanating from the illumination device along the illumination beam path by means of an optical apparatus arranged in the microscope housing of the microscope to the main beam splitter and from there to the lens and through the lens onto the sample, no imaging and/or focusing and/or defocusing optical component being arranged on the light path of the illumination light between the optical apparatus and the lens.

In another embodiment, the present invention provides a microscope which allows an illumination of a sample that is flexibly adaptable to different applications.

According to an embodiment, the microscope of the type mentioned at the outset includes an optical apparatus which is arranged in the microscope housing and directs the illumination light of at least one of a plurality of illumination devices to the main beam splitter, no imaging and/or focusing and/or defocusing optical component being arranged on the light path of the illumination light between the optical apparatus and the lens.

The invention, according to an embodiment, has the very particular advantage that varied wide range of illumination devices, which in each case emit illumination light bundles of different forms and/or sizes, can be used. According to an embodiment of the invention, it is not absolutely necessary for the illumination light emitted by the individual illumination devices to satisfy very restricted spatial requirements in order to have to reach the sample at all through the optical system still to be passed through in the microscope stand. In particular, it is not absolutely necessary for the illumination light emitted by the illumination devices to be collimated. Rather, the illumination light emitted, for example by an illumination device, may also extend convergently or divergently if particular illumination patterns or, for example, only a single point within the sample is to be illuminated by the illumination light of this illumination device.

For example, the illumination light can be focused into the rear pupil plane of the lens, in particular if it is desired for the illumination light to extend in a collimated manner in the region of the sample. As an alternative, it is also possible to form the illumination light in such a way that it extends in a collimated manner in the rear pupil plane of the lens, for example if it is desired to produce a focus in or on the sample. It is, in particular, also possible to focus the illumination light of a first illumination device into the rear pupil plane and to simultaneously focus the illumination light of a second illumination device on or into the sample. This is, for example, in order to illuminate the sample using the illumination light of the first illumination device for imaging while the sample is simultaneously manipulated by the illumination light of the second illumination device.

In this respect, it may, in particular, be provided that the individual illumination devices specifically contain, in particular, adjustable optical elements for forming and/or guiding the illumination light. In this way, a wide range of optical elements of illumination devices can be used in a manner specific to the application, these optical elements, moreover, not having to be stored in the microscope stand itself.

Therefore, the microscope according to an embodiment of the invention not only has the advantage that it can be designed in a particularly compact manner, in particular with regard to the arrangement of the elements of the illumination beam path, but also the quite particular advantage that it provides a broad application spectrum and can be adapted individually to particular sample requirements and/or examination methods, some of the application possibilities, for which the microscope according to an embodiment of the invention is particularly suitable, being mentioned below, only by way of example.

Thus, the sample can be manipulated by the illumination light of a coupled illumination device or by the illumination light at least of a plurality of coupled illumination devices. In addition, or as an alternative, the sample can be bleached or cut in a pointwise or planar manner or along a line.

In particular, the microscope according to the invention is suitable for use in the field of FRAP applications (Fluorescence Recovery After Photobleaching) if it is a question, for example, of bleaching a sample region in a targeted manner and meanwhile or subsequently observing diffusion processes. In this case, for example, the light of an illumination device may be used for pointwise bleaching while the light of another illumination device is used for planar illumination in order to observe the entire sample.

The illumination light of one of the illumination devices may, for example, also be used as optical tweezers. For this application, in particular, a beam deflection device may be present, for example within the housing of the illumination device in question, as well, in order to be able to move the focus of the illumination light of this illumination device relative to the sample.

The microscope according to the invention is also suitable, in particular, for applications in the field of FLIM (Fluorescence Lifetime Imaging). This is so, in particular, if it is a question, for example, of examining the service life of the excited state of a fluorescent dye of the sample or variables connected therewith.

Other application possibilities of the microscope according to the invention are, for example, in the field of photo activation, optogenetics, TIRF (Total Internal Reflection Microscopy), STORM (Stochastic Optical Reconstruction Microscopy) and in the field of structured illumination for maximum resolution.

In a very particularly advantageous configuration, the optical apparatus is arranged in the microscope housing. A configuration of this type namely provides the very particular advantage that the optical apparatus can be arranged within the microscope housing, for example in relation to mechanical coupling interfaces for different illumination devices, it being effectively protected against external influences, in particular against accidental incorrect adjustment.

In particular, it may be provided in a configuration of this type that at least one of the illumination devices is arranged outside the microscope housing. A configuration in which all the plurality of illumination devices are arranged outside the microscope housing is quite particularly advantageous.

A configuration in which the microscope housing has at least one mechanical coupling interface, to which one of the illumination devices can be coupled and/or is fixed in a predefined desired position, can be handled particularly quickly and reliably. The coupling interface may, for example, be designed in the manner of a bayonet in such a way that it can be mechanically coupled to a counter-interface of an illumination device, the illumination device being automatically guided into a predefined desired position during coupling. This means that a coupled illumination device does not have to be laboriously adjusted relative to the illumination beam path of the microscope and, in particular, to the optical apparatus, which directs the illumination light of the illumination device to the main beam splitter.

A configuration in which the microscope housing has a plurality of mechanical coupling interfaces to which one of the illumination devices can be coupled and/or fixed in each case, in a predefined desired position in each case is very particularly advantageous. It may be advantageously provided here that each of the coupling interfaces can be mechanically coupled to a counter-interface of an illumination device in each case, each illumination device being automatically guided into a predefined desired position in each case while it is being coupled. In a configuration of this type, the user can easily and reliably install different combinations of illumination devices or exchange individual or a plurality of illumination devices without relatively great effort during an examination.

The illumination device preferably has its own housing. A housing of its own has the advantage that the individual elements of the illumination device are protected against damage and soiling and that the illumination device can be easily and reliably handled as a whole, in particular it can be coupled to and decoupled from a coupling interface.

The illumination device has at least one light source which may be designed as a laser or non-coherent light source. The light source may, for example, be arranged within a housing of the illumination device. Alternatively, this is an external light source which is arranged outside the housing of the illumination device and is coupled at a coupling interface to a selected illumination device. In a particular configuration, the light source is arranged outside a housing of the illumination device, the illumination light of the light source being transported by means of an optical fiber to a module which can be coupled to a coupling interface and may contain at least one optical element for forming and/or guiding the illumination light and/or a beam deflection device. A module of this type preferably has its own housing.

As already mentioned, it may advantageously be provided that the individual illumination devices specifically contain at least one optical element for forming and/or guiding the illumination light. The optical element for forming and/or guiding the illumination light is advantageously adjustable. An adjustment may take place manually, for example by means of adjustment elements mechanically guided to the outside, and/or be remotely controlled, for example by activating actuators of the illumination device in question.

The optical element may, for example, be a lens or a zoom optical system. In particular, it may also be provided that the illumination device has a beam deflection device, such as, for example, one or more mirrors that are adjustable with respect to the deflection angle or a lens that is movable transverse to the optical axis.

In a particular configuration, the microscope has a holding apparatus which holds the optical apparatus in a working position, which optical apparatus directs the illumination light of at least one of a plurality of illumination devices to the main beam splitter. It may, in particular, be advantageously provided here that the optical apparatus is exchangeably held, in particular exchangeably without tools, in the holding apparatus. For example, the holding apparatus may be designed in such a way that a working position for the optical apparatus is predefined and/or adjustable by means of at least one stop element. Alternatively, or in addition, the holding apparatus may have at least one guide element which directs the optical apparatus into the working position upon insertion into the holding apparatus.

The aforementioned configurations have the quite particular advantage that the optical apparatus can easily and without additional adjustment outlay be exchanged for another optical apparatus which has other optical properties and/or which is adjusted for the use of other illumination devices.

Alternatively, it may also be provided that the holding apparatus carries a plurality of different optical apparatuses, of which one can selectively be transferred in each case into the working position. A configuration of this type has the particular advantage that a plurality of optical apparatuses may be present within the microscope housing, and therefore the user does not have to introduce any new optical apparatus into the microscope housing if a different optical apparatus is to be used. In particular, it may also be provided that the holding apparatus, activated externally, automatically carries out an exchange of the optical apparatus. A configuration of this type has the advantage that the user can carry out an exchange of the optical apparatus very quickly and without having to open the microscope housing.

In a particular configuration, the holding apparatus has a magazine or a revolver comprising a plurality of different optical apparatuses, of which one can be selectively transferred in each case into the working position. In particular, it may be provided that the magazine or the revolver can be controlled in a motor-driven manner in such a way that the desired optical apparatus is transferred into the working position in each case.

In particular, for an application in which illumination light of different illumination devices is to be applied sequentially to a sample, the optical apparatus may be designed as a movable mirror which is selectively transferrable in each case into one of a plurality of different positions, one of the illumination devices being associated with each position and the illumination light of the associated illumination device reaching the main beam splitter in the position in question. For example, it may be provided that the mirror in one position reflects the illumination light of an illumination device associated with the position to the optical apparatus. However, it may also be provided that the mirror in a different position does not reflect the illumination light of an illumination device associated with the position, but merely allows it to pass. In particular, it may also be provided that the mirror in one position blocks the illumination light of an illumination device not associated with this position.

In particular, it may be advantageously provided that the mirror is moved by means of a motor. Alternatively, or in addition, it may also be provided that the mirror can be operated or is operated by a mechanical change-over mechanism. The change-over mechanism is preferably designed here in such a way that it can be operated without having to open the microscope housing. For example, an operating element projecting out of the microscope housing may be present.

The optical apparatus is preferably designed as a beam combiner which spatially combines the illumination light bundles emitted by the different illumination devices in such a way that they extend along the same optical axis after the combination. Insofar as it is mentioned below that the beam combiner contains a beam splitter, there is no contradiction. Rather, an optical component, which is generally referred to and marketed as a beam splitter, acts as a beam combiner upon reversal of the light path.

In particular for applications in which the light of at least two of the illumination devices has the same wavelength, the beam combiner may, for example, have a neutral beam splitter. A configuration of this type is considered, for example, in FRAP applications (Fluorescence Recovery After Photobleaching).

For applications in which the illumination light of the different illumination devices has different wavelengths, the beam combiner may also have a colored beam splitter. The illumination light bundles of different wavelengths, and different illumination devices, can thus be combined particularly efficiently for the simultaneous illumination of a sample. A configuration of this type is considered, for example, in fluorescence examinations and/or in examinations in which one of the illumination light bundles acts as optical tweezers, and/or in examinations in which an ablation takes place with illumination light, in particular UV light.

In order to effectively couple the polarized illumination light of different illumination devices, for example, it may be advantageously provided for the beam combiner to have a polarization beam splitter. An effective coupling is achieved, in particular, when the illumination light bundles of two illumination devices have perpendicular linear polarization with respect to one another. A configuration of this type is considered, for example, in TIRF applications (Total Internal Reflection Microscopy).

The microscope according to the invention may be designed, for example, as a wide-field microscope.

As already mentioned, it may, for example, be provided according to the application that the illumination light of at least one of the plurality of illumination devices illuminates a sample in a planar manner and/or that the illumination light of at least one of the plurality of illumination devices illuminates the entire field of vision. An illumination of this type is recommended, in particular, if the sample as a whole or a relatively large sample part is to be imaged.

Alternatively, or additionally, it may also be provided that the illumination light of at least one of the plurality of illumination devices illuminates a sample in a pointwise manner and/or that the illumination light of at least one of the plurality of illumination devices illuminates exclusively one part of the field of vision. This is, for example, to optically manipulate a part region of the sample.

FIG. 1 shows a first embodiment of a microscope according to the invention. The microscope has a lens 1 and a main beam splitter 2, the lens 1 being arranged in the common part of an observation beam path 3 and an illumination beam path 4 and the main beam splitter 2 separating the observation beam path 3 from the illumination beam path 4.

The microscope also has an optical apparatus 5 which is arranged in a microscope housing 6 and which directs first illumination light 7 of a first illumination device 8 and second illumination light 9 of a second illumination device 10 to the main beam splitter 2, no imaging and/or focusing and/or defocusing optical component being arranged on the light path of the illumination light 7, 9 between the optical apparatus 5 and the lens 1. Only the main beam splitter 2 and optionally one or more filters are preferably located on the light path of the illumination light 7, 9 between the optical apparatus 5 and the lens 1.

The optical apparatus 5 has a beam combiner 23 which spatially combines the first illumination light 7 and the second illumination light bundle 9 such that said second bundle reaches the lens 1 simultaneously and having the same propagation direction via the main beam splitter 2.

The illumination light 7, 9 is focused by means of the lens 1 on a sample 11 which is positioned on a microscope table 12. The observation light 13 emanating from the sample 11 arrives through the lens 1 at the main beam splitter 2, passes it and then arrives at a detector 14 which may, for example, be designed as a camera. In particular, it may be provided that the sample 11 or a relatively large region of the sample 11 is imaged in a planar manner in the detector plane of the detector 14 by means of a tube lens 24.

The first illumination device 8 and the second illumination device 10 are arranged outside the microscope housing 6. The microscope housing 6 has a first mechanical coupling interface 20 and a second mechanical coupling interface 21. The coupling interfaces 20, 21 are designed in such a way that they can be coupled to counter-interfaces of the illumination devices 8, 10 and an illumination device 8, 10 is automatically guided upon coupling thereof into a predefined desired position in each case. The desired position is selected in such a way that no further adjustment is required.

Figure 2:
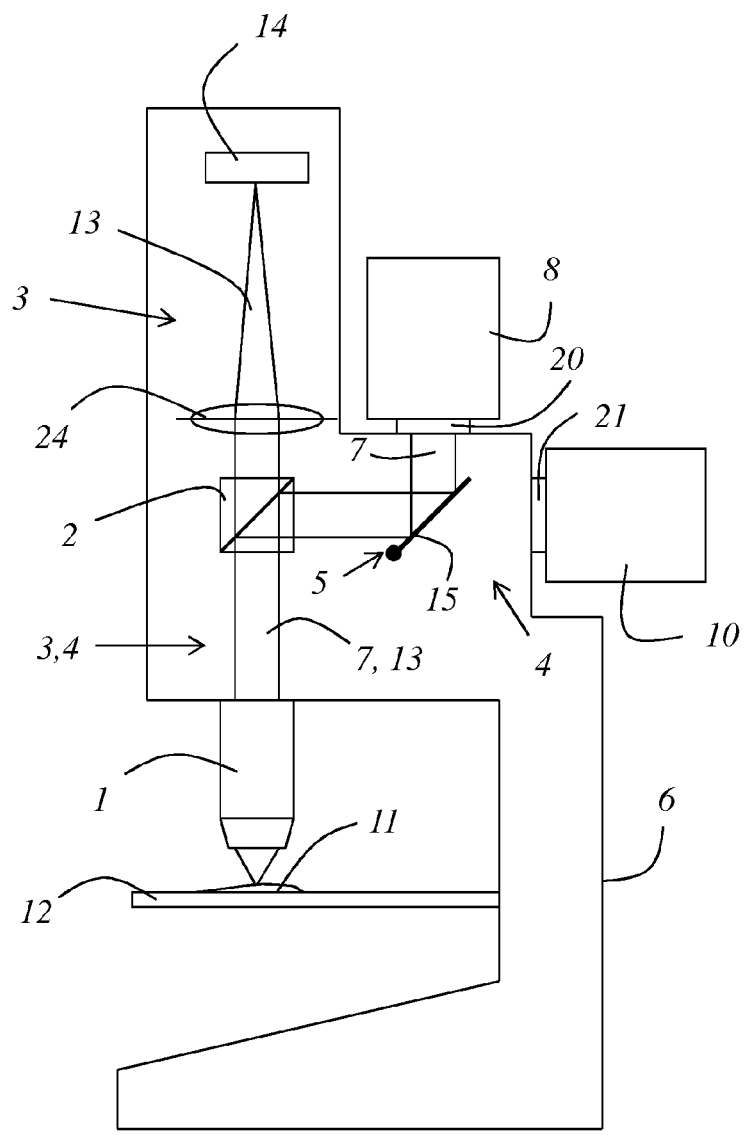
FIG. 2 shows a second embodiment of a microscope according to the invention in a first adjustment.

The second embodiment of a microscope according to the invention, shown in FIG. 2, differs from the embodiment shown in FIG. 1 in that the optical apparatus 5 does not have a beam combiner 23 but a movable mirror 15 which can selectively be transferred into one of a plurality of different positions in each case, one of the illumination devices 8, 10 being associated with each position and the illumination light 7, 9 of the associated illumination device 8, 10 reaching the main beam splitter 2 in the position in question.

FIG. 2 shows the second embodiment having a position of the movable mirror 15 in which the first illumination light 7 of the first illumination device 8 is reflected to the main beam splitter 2, while the second illumination light 9 of the second illumination device 10 is blocked.

Figure 3:
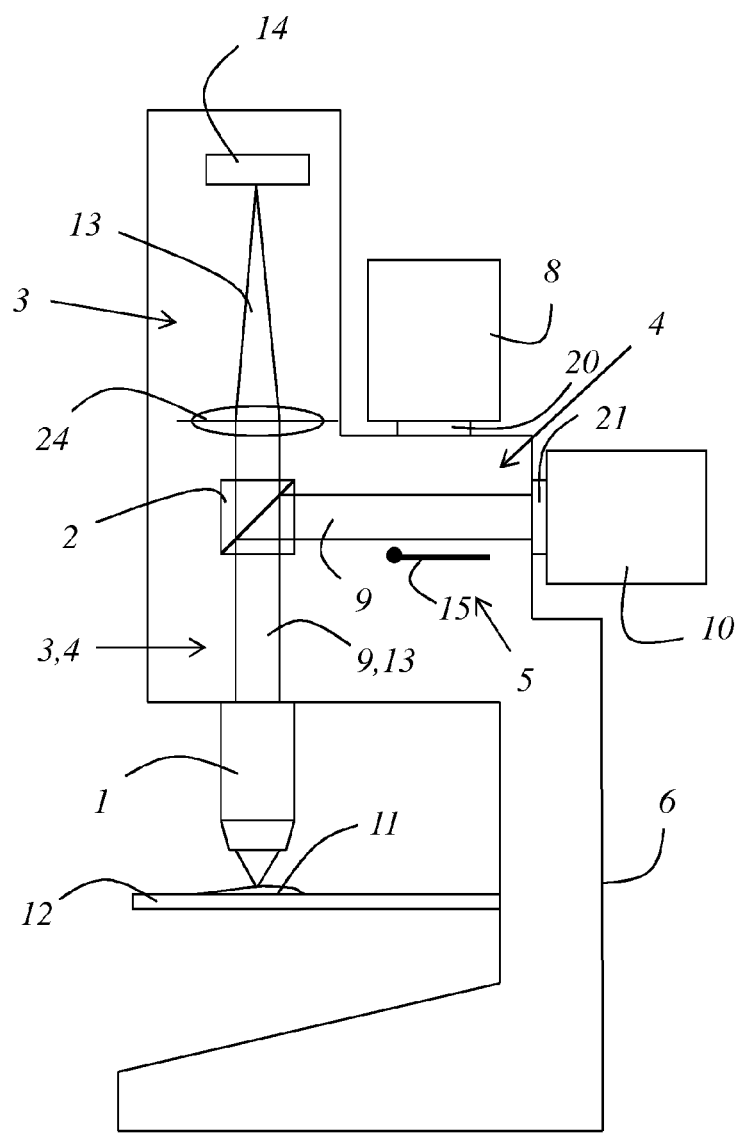
FIG. 3 shows a second embodiment of a microscope according to the invention in a second adjustment.

FIG. 3 shows the second embodiment having a position of the movable mirror 15 in which the second illumination light 9 of the second illumination device 10 reaches the main beam splitter 2.

Figure 4:
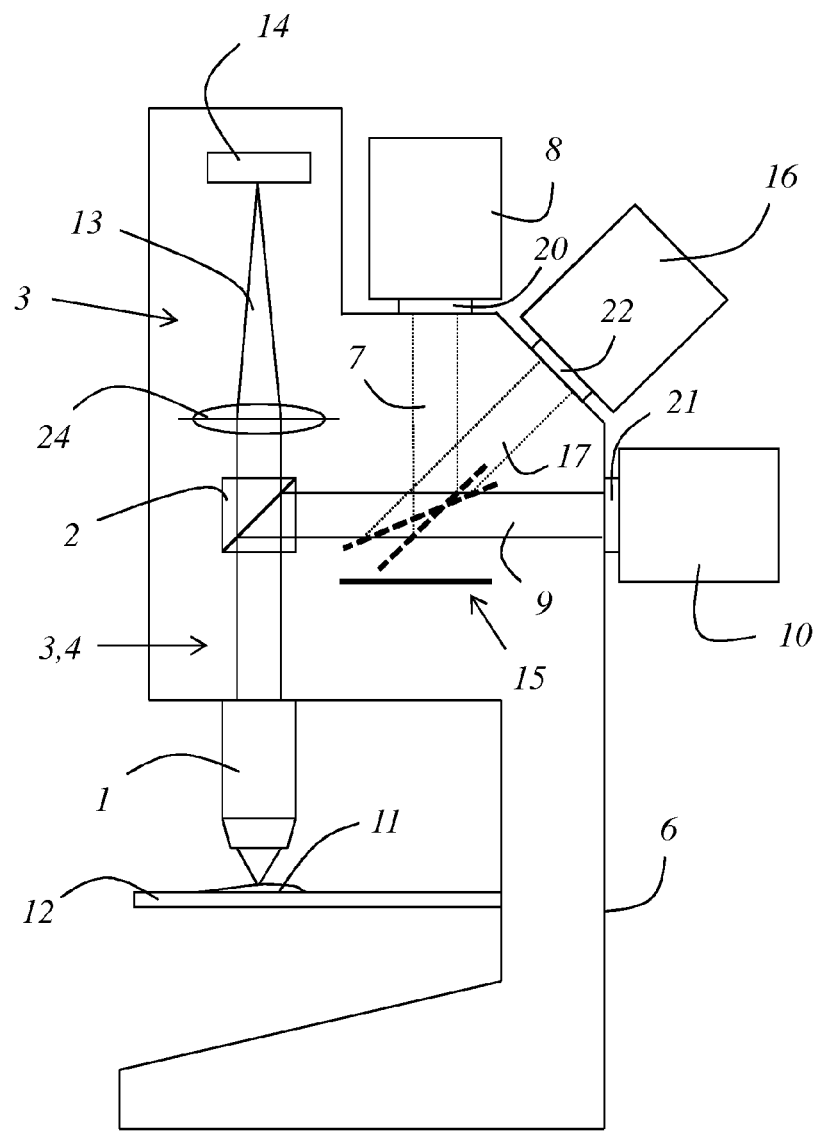
FIG. 4 shows a third embodiment of a microscope according to the invention.

FIG. 4 shows a configuration which, apart from a first illumination device 8 and a second illumination device 10, has a third illumination device 16. The third illumination device 16 is coupled to a third mechanical coupling interface 22 of the microscope. One position of the mirror 15 is associated with each illumination device 8, 10, 16 such that the first illumination light 7 of the first illumination device 8 or the second illumination light 9 of the second illumination device 10 or the third illumination light 17 of the third illumination device 16 can be selectively directed to the main beam splitter 2.

Figure 5:
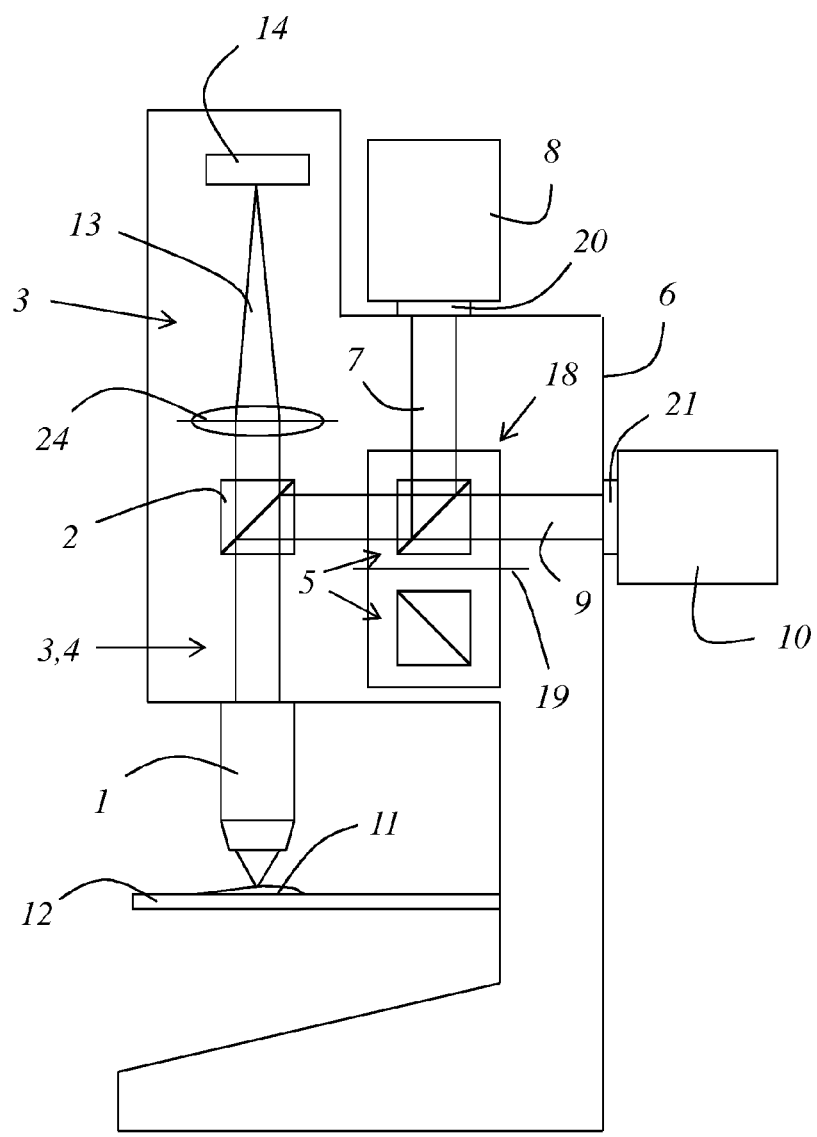
FIG. 5 shows a fourth embodiment of a microscope according to the invention.

FIG. 5 shows an embodiment of a microscope according to the invention which has a holding apparatus 18 in which a plurality of optical apparatuses 5 are stored. The holding device 18 is designed as a revolver which is rotatably mounted about a rotational axis 19 such that one of the stored optical apparatuses 5 can be selectively transferred in each case into the working position.

Figure 6:
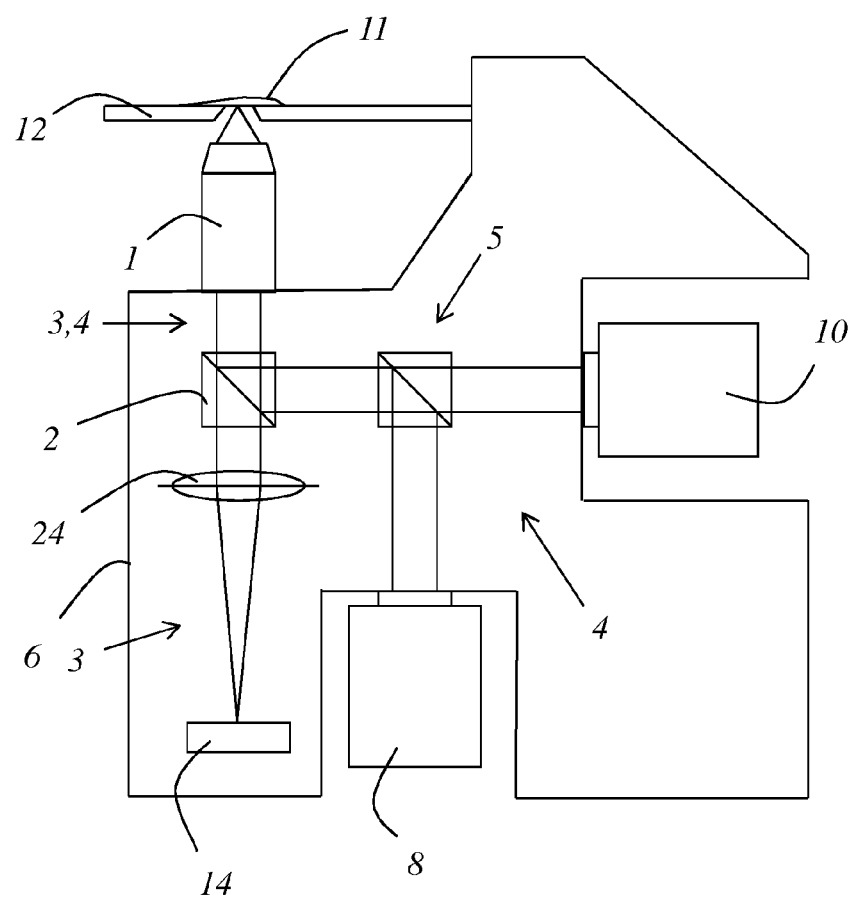
FIG. 6 shows a fifth embodiment of a microscope according to the invention.

FIG. 6 schematically shows an embodiment in the form of an inverse microscope which optically has substantially the same structure as the microscope shown in FIG. 1.

It is pointed out that the arrangement of the illumination devices relative to one another and relative to the microscope is shown only schematically in the embodiments shown in the figures. In particular, it may be provided that at least two illumination devices 8, 10 are arranged in one plane oriented perpendicularly to the optical axis of the lens 1. A configuration of this type allows a compact and ergonomic design of the microscope and ensures simple and reliable handling when coupling and decoupling the illumination devices 8, 10. FIGS. 7 to 11 show, by way of example, possible embodiments of illumination devices 8, 10 which can be used depending on the type of application. An advantage of the present invention is that it is not necessary to change over or adapt an optical system within the microscope housing 6, apart from changing over in order to select or combine the illumination light 7, 9 of a plurality of illumination devices 8, 10. Rather, it is entirely sufficient to couple the desired illumination device 8, 10 or the desired illumination devices 8, 10 in each case. The illumination devices 8, 10 are preferably designed in such a way that the illumination light 7, 9 already has the required properties, in particular with regard to convergence, divergence or beam diameter, when it leaves the illumination device 8, 10; for example to produce a focus in the pupil or the object plane of the lens 1. This is without an imaging and/or focusing and/or defocusing optical component being arranged on the light path of the illumination light 7, 9 from the illumination device 8, 10 to the lens 1.

Figure 7:
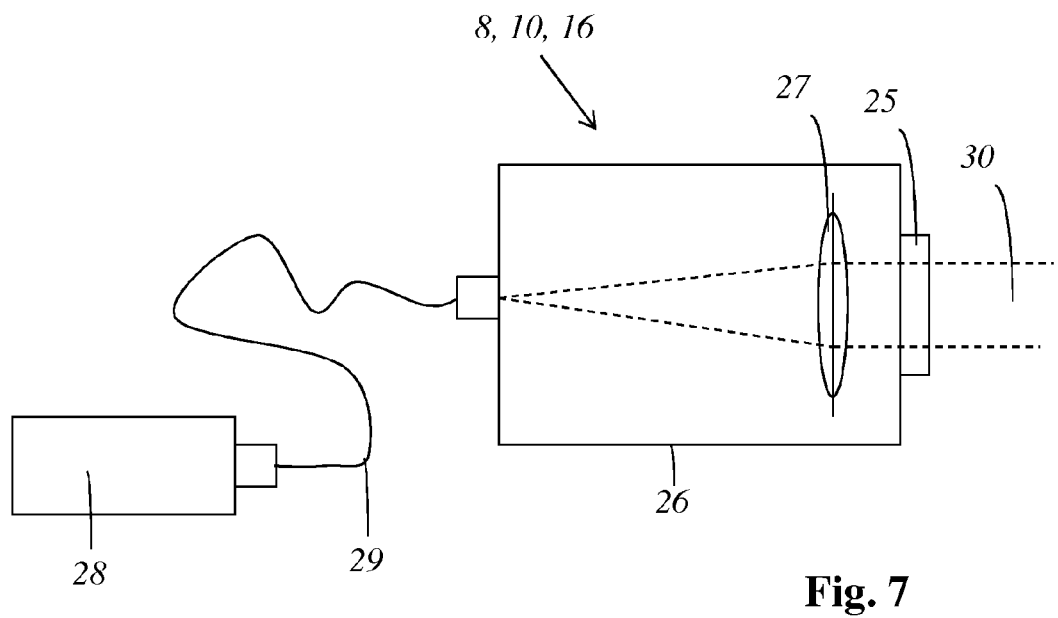
FIG. 7 shows a first embodiment of an illumination device according to the invention.

FIG. 7 shows a first embodiment of an illumination device 8, 10, 16 according to the invention which can be used, in particular, as a manipulation device and which has a counter-interface 25 for mechanically coupling the illumination device 8, 10, 16 in a predefined desired position to a mechanical coupling interface 20, 21, 22 of the microscope. The illumination device 8, 10, 16 has its own housing 26 in which a collimation optical system 27 is arranged. Moreover, the illumination device 8, 10, 16 has a light source 28 which is arranged outside the housing 26 and may be designed, for example, as a laser. The illumination light of the light source 28 is transmitted by means of an optical fiber 29 to the housing 26 and collimated by the collimation optical system 27, such that it leaves the housing 26 through the counter-interface 25 as a collimated illumination light bundle 30.

Preferably, no imaging and/or focusing and/or defocusing optical components are located on the light path of the illumination light within the microscope housing, to which the illumination device 8, 10, 16 can be coupled such that the illumination light bundle 30 passes in a collimated manner through the pupil of the lens and is focused into the object plane.

The sample can be manipulated, for example by means of bleaching or cutting or drilling, by the focused illumination light.

Figure 8:
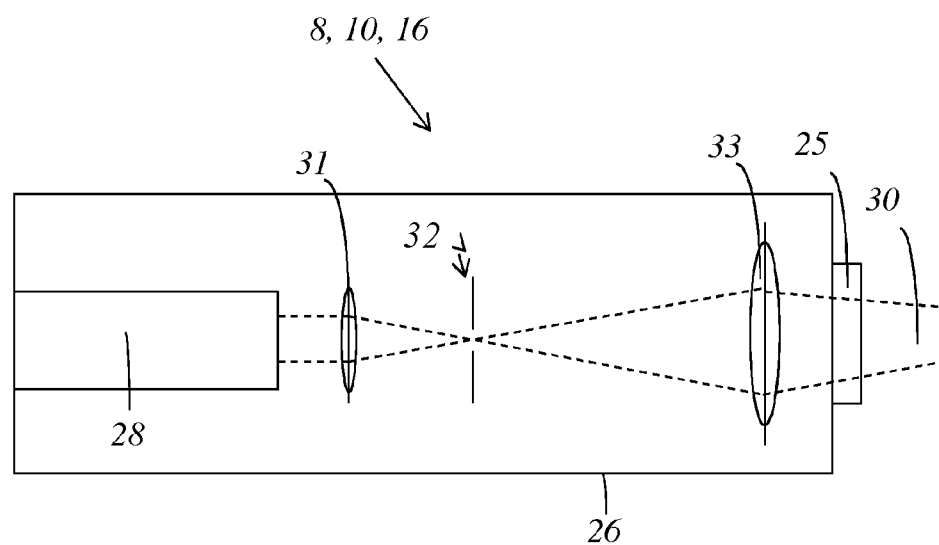
FIG. 8 shows a second embodiment of an illumination device according to the invention.

FIG. 8 shows a second embodiment of an illumination device 8, 10, 16 according to the invention which can be used, in particular, as a manipulation device and which has a counter-interface 25 for mechanically coupling the illumination device 8, 10, 16 in a predefined desired position to a mechanical coupling interface 20, 21, 22 of the microscope.

This illumination device 8, 10, 16 also has its own housing 26. Located in the housing 26 is a light source 28 which, in particular, can be designed as a laser and the illumination light of which is focused by means of a first optical system 31 onto a shutter 32. The light passing through the shutter 32 is focused by a second optical system 33 in such a way that the illumination light in the pupil of the lens of the microscope, to which the illumination device 8, 10, 16 is coupled, has a focus.

This illumination device 8, 10, 16 may, in particular, be used as an optical manipulation device for producing a speckle-free planar illumination of the sample or a part of the sample in the object plane, and this can be advantageously utilized, for example, in the field of FLIM microscopy.

Figure 9:
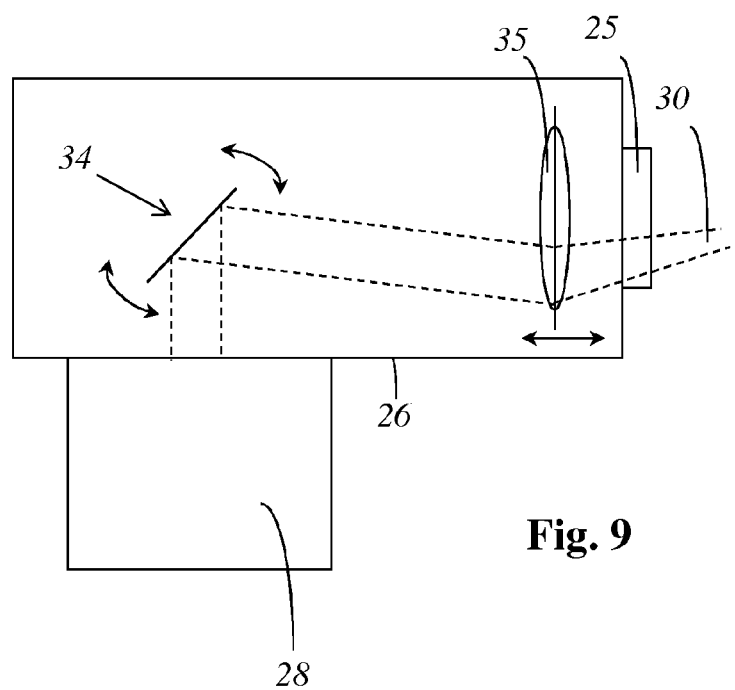
FIG. 9 shows a third embodiment of an illumination device according to the invention.

FIG. 9 shows a third embodiment of an illumination device 8, 10, 16 according to the invention which can also be used, in particular, as a manipulation device and which also has a counter-interface 25 for mechanically coupling the illumination device 8, 10, 16 in a predefined desired position to a mechanical coupling interface 20, 21, 22 of the microscope.

This illumination device 8, 10, 16 also has its own housing 26 to which a light source 28 is coupled externally. Located in the housing 26 is a beam deflection device 34 which can be adjusted with regard to the deflection direction and which receives the illumination light bundle coming from the light source 28 and diverts it to a focusing optical system 35.

The beam deflection device 34 may, for example, have at least one galvanometer mirror or a plurality of galvanometer mirrors connected one behind the other. In particular, the beam deflection device 34 may also have a gimballed mirror. It is also possible for the beam deflection device 34 to be designed as an acousto-optic or electro-optic beam deflection device. The focusing optical system 35 focuses the illumination light bundle in such a way that it has a focus in the pupil of the lens of the microscope to which the illumination device 8, 10, 16 is coupled. With the aid of the beam deflection device 34, the focus can be moved laterally within the pupil plane. In order to be able to axially displace the focus, for example in order to adapt to the different pupil positions of different lenses, the focusing optical system 35 is arranged so as to be axially displaceable, preferably in a manner controlled by a motor.

This illumination device 8, 10, 16 may, in particular, be used as an optical manipulation device for producing an illumination for TIRF applications.

Figure 10:
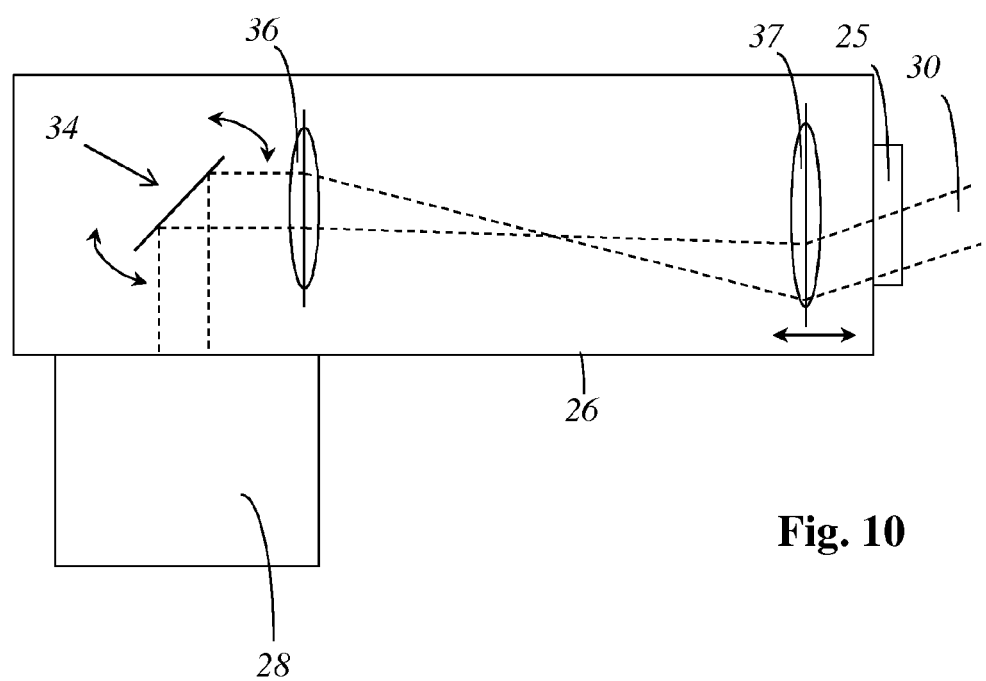
FIG. 10 shows a fourth embodiment of an illumination device according to the invention.

FIG. 10 shows a fourth embodiment of an illumination device 8, 10, 16 according to the invention which can also be used, in particular, as a manipulation device and which also has a counter-interface 25 for mechanically coupling the illumination device 8, 10, 16 in a predefined desired position to a mechanical coupling interface 20, 21, 22 of the microscope.

This illumination device 8, 10, 16 has a light source 28 arranged externally on a housing of the illumination device 8, 10, 16. Located in the housing 26 is a beam deflection device 34 which is adjustable with respect to the deflection direction and receives the illumination light bundle coming from the light source 28 and directs it to a first optical system 36 which focuses the illumination light bundle 30. Located within the housing 26 is moreover a second optical system 37 which collimates the illumination light bundle 30.

Preferably, no imaging and/or focusing and/or defocusing optical components are located on the light path of the illumination light within the microscope housing to which the illumination device 8, 10, 16 can be coupled, and therefore the illumination light bundle 30 passes in a collimated manner through the pupil of the lens and is focused into the object plane.

With the aid of the beam deflection device 34, the focus can be moved laterally within the object plane. This is, for example, to manipulate the sample along a predetermined line. In order to be able to axially displace the focus, for example in order to adapt to the different pupil positions of different lenses, the second optical system 37 is arranged so as to be axially displaceable, preferably controlled by a motor. The beam deflection device may, in particular, be constructed in the manner in which it has already been described in relation to other embodiments.

Figure 11:
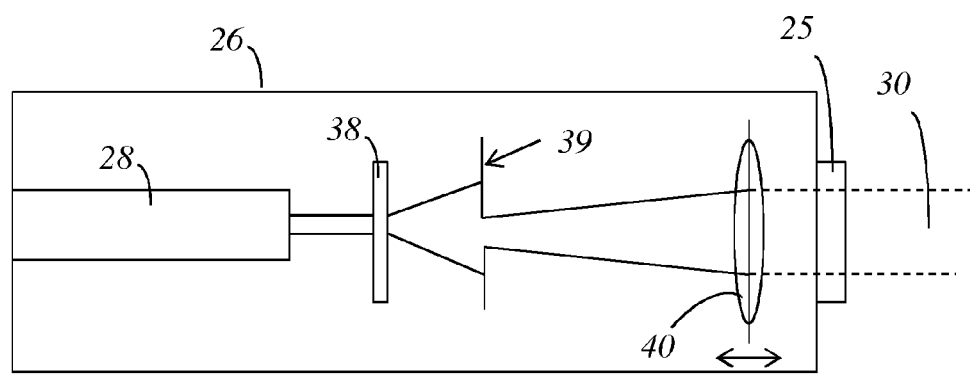
FIG. 11 shows a fifth embodiment of an illumination device according to the invention.

FIG. 11 shows a fifth embodiment of an illumination device 8, 10, 16 according to the invention which can also be used, in particular, as a manipulation device and which also has a counter-interface 25 for mechanically coupling the illumination device 8, 10, 16 in a predefined desired position to a mechanical coupling interface 20, 21, 22 of the microscope.

The illumination device 8, 10, 16 has its own housing in which a light source 28 is arranged. The illumination light emanating from the light source 28 firstly impinges on a diffusing means 38, for example a diffusing disc. The illumination light emanating from there is used to illuminate a shutter of any form. The illumination device 8, 10, 16 contains an imaging optical system 40 which is designed and arranged in order to image the shutter in the object plane. The imaging optical system 40 can also be axially displaced in this configuration in order to axially displace the image of the shutter.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

- 1 lens
- 2 main beam splitter
- 3 observation beam path
- 4 illumination beam path
- 5 optical apparatus
- 6 microscope housing
- 7 first illumination light
- 8 first illumination device
- 9 second illumination light
- 10 second illumination device
- 11 sample
- 12 microscope table
- 13 observation light
- 14 detector
- 15 movable mirror
- 16 third illumination device
- 17 third illumination light
- 18 holding apparatus
- 19 rotational axis
- 20 first mechanical coupling interface
- 21 second mechanical coupling interface
- 22 third mechanical coupling interface
- 23 beam combiner
- 24 tube lens
- 25 counter-interface
- 26 housing
- 27 collimation optical system
- 28 light source
- 29 optical fiber
- 30 illumination light bundle
- 31 first optical system
- 32 shutter
- 33 second optical system
- 34 beam deflection device
- 35 focusing optical system
- 36 first optical system
- 37 second optical system 38 diffusing means
39 shutter
40 imaging optical system

The invention claimed is:

1. A method for optically examining or manipulating a microscopic sample, the method comprising:
   a. positioning the sample in a desired sample position in front of a lens which is arranged both in an observation beam path and in an illumination beam path of a microscope which has a main beam splitter which separates the observation beam path from the illumination beam path,
   b. selecting at least two illumination devices each comprising an illumination optical system from a plurality of different illumination devices depending on at least one of a type of the sample, a type of an examination or a type of a manipulation of the sample to be carried out,
   c. coupling the selected at least two illumination devices each in a predefined position respectively to at least two mechanical coupling interfaces at a housing of the microscope such that illumination light emanating from the selected and coupled at least two illumination devices is in each case directed to an optical apparatus arranged inside of the housing of the microscope, and
   d. directing, by the optical apparatus, the illumination light emanating from at least one of the selected and coupled at least two illumination devices along the illumination beam path to the main beam splitter and from there to the lens and through the lens onto the sample, wherein no optical component that is at least one of an imaging optical component, a focusing optical component or a defocusing optical component is arranged on a light path of the illumination light between the optical apparatus and the lens, and
   wherein the at least two illumination devices emit the illumination light, in each case, in the form of an illumination light bundle which, with regard to at least one of a beam form, divergence, beam diameter or propagation direction, is configured in such a way that:
      a. at least one of the illumination light bundles at least one of has a focus in a rear pupil plane of the lens of the microscope or extends in a collimated manner in a region of a sample, or
      b. at least one of the illumination light bundles at least one of extends in a collimated manner in the rear pupil plane of the lens of the microscope or has a focus on or in the sample.

2. The method according to claim 1, wherein the selected and coupled at least two illumination devices each have a connection for an external light source.

3. The method according to claim 1, wherein at least one external light source is coupled to at least one of the selected and coupled at least two illumination devices.

4. The method according to claim 1, wherein the optical apparatus is a movable mirror which is selectively transferrable into one of at least two different positions, one of the selected and coupled at least two illumination devices being associated in each case with a respective one of the at least two positions and the mirror being adjusted in each case in such a way that a currently desired illumination light is directed to the sample.

5. The method according to claim 4, wherein the mirror is moved from one position of the at least two positions to another position of the at least two positions such that the sample is sequentially illuminated by the illumination light of the selected and coupled at least two illumination devices.

6. The method according to claim 1, wherein the optical apparatus is a beam combiner, by which the illumination light of the selected and coupled at least two illumination devices is combined and directed to the main beam splitter in such a manner that the illumination light emanating from one of the selected and coupled at least two illumination devices reaches the lens simultaneously and with a same propagation direction as the illumination light emanating from another one of the selected and coupled at least two illumination devices via the main beam splitter.

7. The method according to claim 1, wherein at least one of:
   a. the sample is illuminated in a planar manner by the illumination light of at least one of the selected and coupled at least two illumination devices, or
   b. an entire field of vision is illuminated by the illumination light of at least one of the selected and coupled at least two illumination devices.

8. The method according to claim 1, wherein at least one of:
   a. the sample is illuminated in a pointwise manner by the illumination light of at least one of the selected and coupled at least two illumination devices, or
   b. exclusively a limited part of a field of vision of the lens is illuminated by the illumination light of at least one of the selected and coupled at least two illumination devices.

9. The method according to claim 1, wherein at least one of:
   a. the sample is manipulated by the illumination light of the selected and coupled at least two illumination devices, or
   b. the sample is bleached or cut in a pointwise or planar manner or along a line.

10. The method according to claim 1, wherein the method is used for FRAP microscopy (Fluorescence Recovery After Photo-bleaching), for FLIM (Fluorescence Lifetime Imaging), for TIRF microscopy (Total Internal Reflection Microscopy), for STORM (Stochastic Optical Reconstruction Microscopy) or for maximum resolution imaging of the sample or a region of the sample.

11. The method according to claim 1, wherein the optical apparatus is a moveable mirror or an additional beam combiner.

12. The method according to claim 1, wherein the selected and coupled at least two illumination devices are each disposed in a housing, the housings of the selected and coupled at least two illumination devices being coupled in each case to the respective one of the at least two mechanical coupling interfaces at an exterior of the microscope housing.

13. A microscope comprising:
   a microscope housing,
   a lens arranged both in an observation beam path and in an illumination beam path,
   a main beam splitter separating the observation beam path from the illumination beam path,
   at least two illumination devices each comprising an illumination optical system, the at least two illumination devices each being connectable in a predefined position respectively to at least two mechanical coupling interfaces at the microscope housing such that illumination light emanating from the at least two illumination devices is in each case directed to an optical apparatus arranged inside of the housing of the microscope, and the optical apparatus arranged in the microscope housing so as to direct the illumination light of at least one of the at least two illumination devices to the main beam splitter, wherein the microscope does not include an optical component that is at least one of an imaging optical component, a focusing optical component or a defocusing optical component arranged on a light path of the illumination light between the optical apparatus and the lens, and wherein the at least two illumination devices emit the illumination light, in each case, in the form of an illumination light bundle which, with regard to at least one of a beam form, divergence, beam diameter or propagation direction, is configured in such a way that:
a. at least one of the illumination light bundles at least one of has a focus in a rear pupil plane of the lens of the microscope or extends in a collimated manner in a region of a sample, or
b. at least one of the illumination light bundles at least one of extends in a collimated manner in the rear pupil plane of the lens of the microscope or has a focus on or in the sample.

14. The microscope according to claim 13, wherein the at least two illumination device are selectable from a plurality of illumination devices which are each arranged outside the microscope housing.

15. The microscope according to claim 13, further comprising a holding apparatus which holds the optical apparatus in a working position.

16. The microscope according to claim 15, wherein at least one of:
a. the optical apparatus is exchangeably held in the holding apparatus,
b. the working position is predefined or preadjustable by at least one stop element, or
c. the holding apparatus has at least one guide element which directs the optical apparatus into the working position upon insertion into the holding apparatus.

17. The microscope according to claim 15, wherein at least one of:
a. the holding apparatus carries a plurality of different optical apparatuses, of which one is selectively transferrable into the working position in each case, or
b. the holding apparatus has a magazine or a revolver comprising a plurality of different ones of the optical apparatus, of which one is selectively transferrable into the working position in each case.

18. The microscope according to claim 13, wherein the optical apparatus is a movable mirror which is selectively transferrable into one of at least two different positions, one of the at least two illumination devices being associated in each case with a respective one of the at least two positions such that for a respective one of the positions in question, the illumination light of a respective one of the at least two illumination devices reaches the main beam splitter.

19. The microscope according to claim 13, wherein the optical apparatus is a beam combiner arranged to combine the illumination light of the at least two illumination devices and to direct the combined illumination light to the main beam splitter in such a manner that the illumination light emanating from one of the at least two illumination devices reaches the lens simultaneously and with a same propagation direction as the illumination light emanating from another one of the at least two illumination devices via the main beam splitter.

20. The microscope according to claim 19, wherein:
a. the beam combiner has a neutral beam splitter,
b. the beam combiner has a colored beam splitter, or
c. the beam combiner has a polarization beam splitter.

21. The microscope according to claim 13, wherein the microscope is a wide-field microscope, a scanning microscope or confocal scanning microscope.

22. The microscope according to claim 13, wherein:
a. the illumination light of at least one of the at least two illumination devices at least one of illuminates a sample in a planar manner or illuminates an entire field of vision, or
b. the illumination light of at least one of the at least two illumination devices at least one of illuminates the sample in a pointwise manner or exclusively illuminates one part of the field of vision.

23. The microscope according to claim 13, wherein:
a. the at least two illumination devices each have at least one light source which is arranged within a housing of a respective one of the at least two illumination devices, or
b. the at least two illumination devices each have a coupling interface to which at least one external light source, which is arranged outside the housing of the illumination device, is coupleable in each case.

24. The microscope according to claim 23, wherein the illumination light of the external light sources is transported in each case by an optical fiber to a respective module which is coupleable to a respective one of the coupling interfaces of the at least two illumination devices and contains at least one of an optical element for forming the illumination light, an optical element for guiding the illumination light or a beam deflection device.

25. The microscope according to claim 13, wherein a housing of each of the at least two illumination devices includes a counter-interface for mechanically coupling the illumination device in the predefined position respectively to the at least two mechanical coupling interfaces at the housing of the microscope.

26. The microscope device according to claim 13, wherein at least one of:
a. at least one of the at least two illumination devices contains an adjustable beam deflection device,
b. at least one of the at least two illumination devices contains at least one optical element that at least one of forms or guides the illumination light,
c. at least one of the at least two illumination devices has a remotely controllable actuator for adjusting at least one optical element,
d. at least one of the at least two illumination devices has a lens or a zoom optical system,
e. each of the at least two illumination devices has at least one light source, or
f. at least one of the at least two illumination devices has a coupling-in interface to which light of an external light source is coupleable.

27. The microscope device according to claim 13, wherein the optical apparatus is a moveable mirror or an additional beam combiner.

* * * * *